ALEXANDER PHILIPPI.
Improvement in Grain Binders.

No. 119,241. Patented Sep. 26, 1871.

Witnesses:
Robert Burns.
J. W. Herthel.

Inventor:
Alexander Philippi
per Herthel & Co.
Attorneys.

UNITED STATES PATENT OFFICE.

ALEXANDER PHILIPPI, OF ST. LOUIS, MISSOURI.

IMPROVEMENT IN GRAIN-BINDERS.

Specification forming part of Letters Patent No. 119,241, dated September 26, 1871.

*To all whom it may concern:*

Be it known that I, ALEXANDER PHILIPPI, of St. Louis, in the county of St. Louis and State of Missouri, have made certain new and useful Improvements in Grain-Binding Machines; and I do hereby declare that the following is a full and true description thereof, reference being had to the accompanying drawing and to the letters of reference marked thereon.

The object of this invention is to form an improved grain-binding machine designed to be attached to harvesters, and which receives the gavels of grain from the platform of harvesters, and, by means of its revolving apron, conveys said gavels to compressing-finger devices to be bound into bundles. The nature thereof relates to the arrangement and combination of a revolving apron and its gearing devices, operated by the driving-wheels, with a foot-lever and its connecting parts, to operate finger devices to compress the received sheaves of grain into bundles; and also by means whereof the said apron or conveyer is at the same time thrown in or out of gear.

To enable those herein skilled to make and use my said improvements, I will now more fully describe the same, referring to the accompanying drawing.

Figure 1:
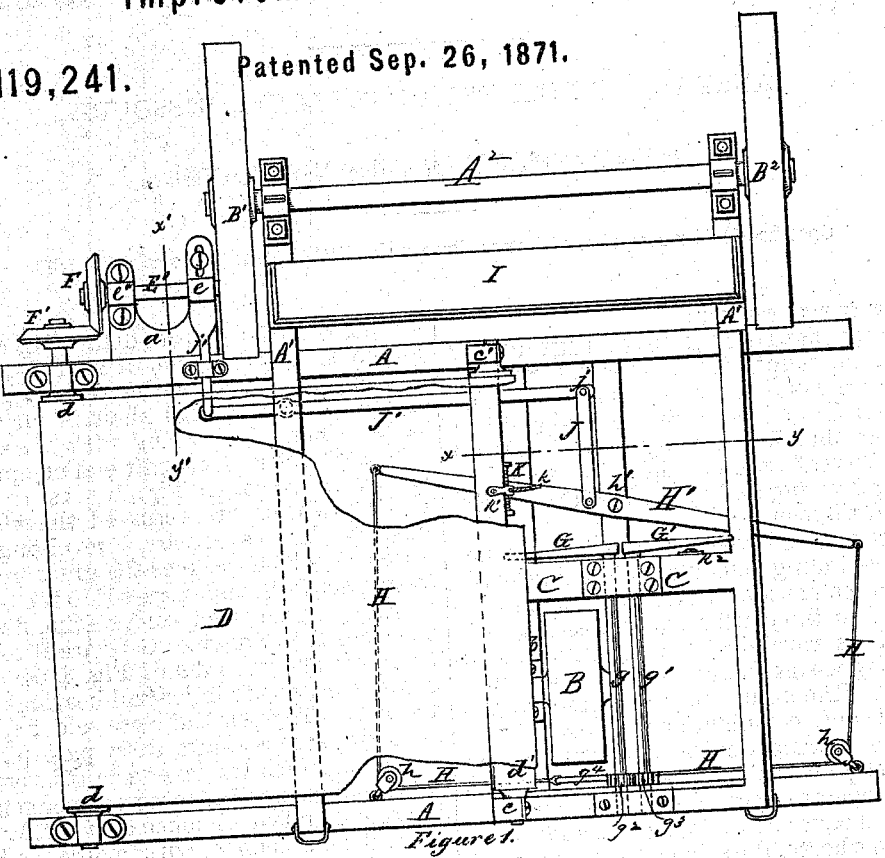
Figure 2:
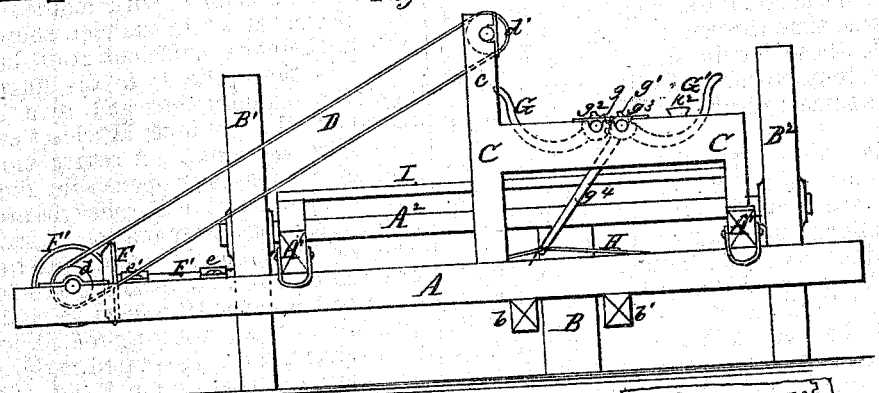
Figure 3:
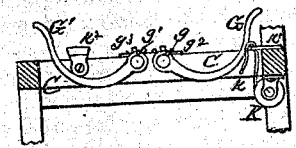
Figure 4:
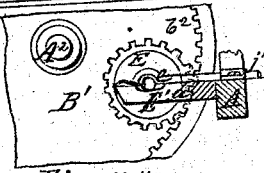

Figure 1 is a top plan with parts removed, shown by broken lines. Fig. 2 is a front elevation. Fig. 3 is a detail sectional elevation at line $x\,y$; Fig. 4, detail sectional elevation at line $x'\,y'$.

The machine consists of a frame, A, bolted transversely to the under side of a horizontal frame, $A^1$, supported in front by front wheel B, properly secured between a horizontal frame, $b\,b^1$, bolted to the under side of frame A. In the rear said frames are supported by the axle $A^2$ of driving-wheels $B^1\,B^2$. On top of said frames A $A^1$ is secured the upright frame C, forming a bed to receive the grain from the apron D. The apron D is formed of suitable cloth material, properly slotted, passing around drums $d\,d'$ operating in proper journal-bearings, the upper drum-shaft $d'$ being secured to uprights $c\,c'$ of the frame C, the lower drum-shaft $d$ being secured to ends of the frame A, as shown in Figs. 1 and 2.

The rotary motion to said apron is imparted as follows: The driving-wheel $B^1$ is cast, having cogs or teeth on its inner flange $b^2$, in which a pinion, E, meshes. (See detail, Fig. 4.) The said pinion is keyed to end of shaft $E'$, secured adjustably by journal-bearings $e\,e'$ to a part, $a$, of the frame A; also to said shaft is further keyed a bevel-wheel, F, gearing with a second bevel-wheel, $F'$, secured to shaft end of apron-drum $d$, as clearly shown in Fig. 1. As, therefore, the driving-wheels are actuated the wheel $B^1$ and gearing devices impart a revolving motion to apron D, which receives the grain from the harvester-platform and carries it to the bed of frame C, dropping between compressing-fingers G $G'$. The said finger devices G $G'$ are of the constructive form shown in detail, Fig. 3, being keyed to shafts $g\,g^1$ resting in journal-bearings secured to frame C. To open and close said finger devices their respective shafts carry part-pinions $g^2\,g^3$, to one of which the lever-arm $g^4$ is attached, its other end connecting to rope attachment H passing round pulleys $h$ hooked to frame A. The ends of said rope connect with foot-lever $H'$, having its fulcrum at $h'$, in manner shown in Fig. 1. When, therefore, sufficient grain has been conveyed by the apron D to the fingers G $G'$, the operator, seated upon seat I, by a forward push motion of the foot-lever $H'$ closes said fingers to compress the grain. A return motion of said foot-lever releases or opens said finger devices. At the same time that the sheaves are being compressed the feeding operation of the apron D is arrested to enable the operator to tie or bind the grain in bundles. This is accomplished by pivoting to foot-lever $H'$ a lever, J, made to connect by a joint, $j$, to a connecting-rod, $J'$, hooked to end of a shifting lever, $j'$, secured to the slotted journal-bearing $e$, as shown in Fig. 1. By thus connecting the gearing devices that operate the apron D to foot-lever $H'$ the same motion of said foot-lever which closes the finger devices G $G'$ to compress the grain also throws said apron out of gear. Similarly, a reverse or return motion of said foot-lever opens said finger devices and shifts apron in gear for renewed operation. The sheaves or gavels are bound by a spool-twine, K, properly secured to the frame C, the twine or cord $k$ passing through an eyelet, $k^1$, and is cut by a knife-edge, $k^2$, arranged as shown in Figs. 1 and 3. To the front of the frame are proper clevis attachments to secure the grain-binder to any harvester, the attachment being such that the platform of the harvester connects in line with the apron of the binding-machine.

The improved grain-binder is simple, cheap, and durable in construction.

Having thus fully described my said invention, what I claim is—

In a grain-binder, the driving-wheel $B^1$, pinion E, shaft $E'$, bevel-wheels F $F'$, operating apron D, in combination with slotted shift-lever $j'$, connecting parts $J'$ $j$ J, foot-lever $H'$, rope attachment H, pulleys $h$, lever-arm $g^4$, shafts $g$ $g^1$, part-pinions $g^2$ $g^3$, and compressing-fingers G $G'$, all arranged, supported, and constructed to operate as and for the purpose set forth.

In testimony of said invention I have hereunto set my hand in presence of two witnesses.

ALEX. PHILIPPI.

Witnesses:
 WILLIAM W. HERTHEL,
 EDWARD WAMPEY.

(47)